United States Patent
Hatakeyama

(10) Patent No.: US 9,254,892 B2
(45) Date of Patent: Feb. 9, 2016

(54) FIXATION RELEASING DEVICE

(71) Applicant: Kiyoshi Hatakeyama, Yokosuka (JP)

(72) Inventor: Kiyoshi Hatakeyama, Yokosuka (JP)

(73) Assignee: JAPAN AGENCY FOR MARINE-EARTH SCIENCE AND TECHNOLOGY, Yokosuka-Shi (JP)

( * ) Notice: Subject to any disclaimer, the term of this patent is extended or adjusted under 35 U.S.C. 154(b) by 22 days.

(21) Appl. No.: 14/349,824

(22) PCT Filed: Oct. 5, 2012

(86) PCT No.: PCT/JP2012/076037
§ 371 (c)(1),
(2) Date: Jun. 26, 2014

(87) PCT Pub. No.: WO2013/051720
PCT Pub. Date: Apr. 11, 2013

(65) Prior Publication Data
US 2014/0315451 A1  Oct. 23, 2014

(30) Foreign Application Priority Data
Oct. 6, 2011 (JP) ................................. 2011-221881

(51) Int. Cl.
| | |
|---|---|
| *B63G 8/00* | (2006.01) |
| *B63B 22/06* | (2006.01) |
| *G01V 1/16* | (2006.01) |
| *B63B 22/08* | (2006.01) |
| *G01V 1/18* | (2006.01) |
| *B63B 21/24* | (2006.01) |

(52) U.S. Cl.
CPC ................. *B63B 22/06* (2013.01); *B63B 22/08* (2013.01); *G01V 1/168* (2013.01); *G01V 1/18* (2013.01); *B63B 21/24* (2013.01)

(58) Field of Classification Search
USPC .............................................. 441/33; 114/312
IPC .................................. B63B 22/06,22/08, 21/24
See application file for complete search history.

(56) References Cited

FOREIGN PATENT DOCUMENTS

| | | |
|---|---|---|
| JP | 63-191918 | 8/1988 |
| JP | 08-271291 | 10/1996 |
| JP | 09-196710 | 7/1997 |
| JP | 2006-030124 | 2/2006 |

OTHER PUBLICATIONS

International Search Report, Date of mailing: Jan. 15, 2013.

*Primary Examiner* — Stephen Avila
(74) *Attorney, Agent, or Firm* — Rankin, Hill & Clark LLP

(57) ABSTRACT

A fixation releasing device by which a buoyant body and a weight may be securely fixed and the fixed state between the buoyant body and the weight may be readily released, using a simple structure. The fixation releasing device is made from a buoyant body, a weight, and a connection designed to connect the buoyant body and weight. The connection device has a connection structure made from a closed loop member, rotation arms, and connection members. A connection member is engaged with each rotation arm, and rotation of each rotation arm is restrained by the closed loop member, thereby fixing the buoyant body. To release the buoyant body, a trigger mechanism provided at the closed loop member is operated to fusion cut the closed loop member. Then, each rotation arm is rotated, and then the connection member comes out of each rotation arm, thereby releasing the buoyant body.

15 Claims, 6 Drawing Sheets

FIXATION RELEASING DEVICE

TECHNICAL FIELD

The present invention relates to a fixation releasing device configured to release connection between a buoyant body and a weight by a separation mechanism.

BACKGROUND ART

A fixation releasing device has conventionally been known. The fixation releasing device comprises a buoyant body and a weight connected by a connection device and configured to release connection between the buoyant body and the weight by a separation mechanism. There is provided an OBS (Ocean Bottom Seismograph), for example, configured to be installed on a sea floor or at the bottom of the ocean to carry out measurement in order to conduct a seismic survey by sinking the OBS onto the bottom of the ocean. In a seismic refraction survey to be conducted to study a mechanism of occurrence of an earthquake at the bottom of the ocean or for other purposes, an artificial seismic wave is generated, and the sound wave refracted at a boundary surface between respective strata under the ocean bottom is received by a large number of ocean bottom seismographs installed at the bottom of the ocean at predetermined distances, thereby carrying out measurement. The ocean seismograph thus used is formed by a combination of an ocean bottom seismograph body and an anchor (weight), and is sunk at the bottom of the ocean. The ocean seismograph body is a buoyant body including therein a sensor and other parts. The anchor is disposed under the buoyant body in order to moor the ocean seismograph body at the bottom of the ocean. After the measurement, a recovery operation of a body portion of the ocean seismograph is performed for data collection, device maintenance, or other purposes. The recovery operation is performed by operating a separation mechanism provided at a connection device configured to connect the buoyant body and the weight.

As the separation mechanism, there is a gunpowder method (disclosed in JP08-271291A (Patent Document 1)), an electric corrosion method (disclosed in JP2006-030124A (Patent Document 2)), etc. In the gunpowder method, an action of cutting a cable configured to connect a buoyant body and a weight with a cutting blade is triggered by explosion of gunpowder. In the electric corrosion method, a metal plate (such as a stainless plate) or a metal wire, configured to connect a buoyant body and a weight is electrically corroded forcibly to be cut. The buoyant body and the weight are thereby separated.

PRIOR ART DOCUMENTS

Patent Documents

Patent Document 1: JP08-271291A
Patent Document 2: JP2006-030124A

SUMMARY OF INVENTION

Technical Problems

As to the gunpowder method, however, a structure for moving the separation mechanism is complex and large in size. Thus, the separation mechanism increases in weight and volume.

As to the electric corrosion method, it needs several minutes to ten several minutes to force the metal plate or the metal wire to be electrically corroded and to be cut. As one technical problem, when the separation mechanism is installed at the bottom of the ocean for a long period of time, the metal plate or the metal wire is subject to natural corrosion or a film is formed on the metal plate or the metal wire. The separation mechanism may not be thereby operated normally. As another technical problem, the method of electrically corroding the metal plate or the metal wire forcibly cannot be used in fresh water.

An object of the present invention is to provide a fixation releasing device by which a buoyant body and a weight may be securely fixed and the fixation state between the buoyant body and the weight may be readily released.

Another object of the present invention is to provide a fixation releasing device in which an installation space of other components may be secured at a top portion of a buoyant body.

Still another object of the present invention is to provide a fixation releasing device capable of being operated even if the fixation releasing device is installed at the bottom of the ocean for a long period of time.

Solution to Problems

A fixation releasing device of the present invention comprises a connection device configured to separatably connect a buoyant body and a weight disposed under the buoyant body. The connection device includes a trigger mechanism configured to release connection between the buoyant body and the weight when the trigger mechanism comes into an operation state by a trigger signal. The connection device includes: a closed loop member including one or more portions to be fusion cut that are formed of a thermoplastic material; and a connection structure disposed between the closed loop member and the weight, and configured to restrain the buoyant body when the closed loop member is in a closed state and to release restraint of the buoyant body when the closed loop member comes into an open state. Then, the trigger mechanism includes one or more fusion cutting devices configured to fusion cut the one or more portions to be fusion cut in the closed loop member, thereby bringing the closed loop member into the open state when the trigger mechanism comes into the operation state.

Thus, in the fixation releasing device of the present invention, the state of restraining the buoyant body and the state of releasing restraint of the buoyant body are formed and the state of releasing restraint of the buoyant body are formed by the connection structure and the closed loop member. Fixation and release of buoyant body and the weight are thereby controlled. If the closed loop member including the one or more portions to be fusion cut is used for the connection device, a connection position between the closed loop member and the connection structure is not limited when the closed loop member and the connection structure are connected. Thus, the connection structure may arbitrarily be configured. Accordingly, the closed loop member and the weight may be connected at arbitrary locations by the connection structure using two or more string-like connection members, for example. Alternatively, the closed loop member and the weight may be connected by the connection structure using a sheet-like or a net-like connection member, for example. The buoyant body may be thereby readily and securely restrained using the connection structure having the arbitrary configuration. When the closed loop member is disposed to surround a top portion of the buoyant body provided on an opposite side of the weight, in particular, a free space is provided at the position of the top portion of the buoyant body. Thus, a location for disposing a component constituting the fixation releasing device, which is otherwise needed to be installed outside the buoyant body, may be secured at the top portion of the buoyant body. When the fixation releasing device is an ocean bottom seismograph, for example, a receiver (transducer) for receiving a trigger signal may be disposed at the top portion of the buoyant body. Further, by fusion cutting the one or more portions to be fusion cut by using the trigger mechanism, the closed loop member is opened. Restraint of the buoyant body is thereby released. Thus, there is no need for a complex mechanism in order to release the restraint. Further, the buoyant body and the weight may be separated in a short period of time (in several seconds).

Further, the closed loop member is not formed of a metal. No corrosion therefore occurs. Thus, even if the fixation releasing device is installed underwater for a long period of time, the buoyant body and the weight may be reliably separated.

It is enough to provide one portion to be fusion cut and one fusion cutting device. Assume, however, that a plurality of the portions to be fusion cut and a plurality of the fusion cutting devices are provided. Then, the connection device may be reliably brought into a connection released state when at least one of the fusion cutting devices operates to fusion cut at least one of the portions to be fusion cut in the closed loop member. Redundancy of the fixing releasing device may be therefore secured. Assume that the fixation releasing device is used for the ocean bottom seismograph, for example, and that the trigger mechanism is operated after measurement during a predetermined period to recover a measuring device included in the buoyant body. Assume further that a plurality of the portions to be fusion cut are provided at the closed loop member and a plurality of the fusion cutting devices are installed. Then, when at least one of the fusion cutting devices operates, the buoyant body may be caused to come up toward the surface of the ocean even if the other fusion cutting devices do not operate for some reason. The measuring device may be thereby reliably recovered.

When the closed loop member is disposed to surround the top portion of the buoyant body, the connection structure may have an arbitrary configuration. To take an example, the connection structure may be configured to include a plurality of connection members and a plurality of engaging mechanisms. In this case, the plurality of connection members are disposed in a peripheral direction of the buoyant body at intervals, whereby one end of each connection member is fixed to the weight and the other end of each connection member includes an engaging portion. Then, the plurality of engaging mechanisms are configured to hold a plurality of the engaging portions of the plurality of connection members and the closed loop member in an engaged state using a tensile force to be applied to the plurality of connection members when the closed loop member is in the closed state and to release the engaged state between the plurality of the engaging portions of the plurality of connection members and the closed loop member using a force to be applied from the buoyant body to the plurality of connection members when the closed loop member comes into the open state (or a force to be applied to the connection members when the buoyant body rises by means of buoyancy). The "tensile force to be applied to the plurality of connection members" may be adjusted by appropriately setting the length of each connection member. Assume that holding and release of the engaged state between the engaging portions and the closed loop member are performed using the force to be applied to the plurality of connection members in this manner. Then, the engaged state between the engaging portions and the closed loop member may be readily and reliably released only if the closed loop member comes into the open state. The buoyant body may be thereby reliably released.

Specifically, the engaging portions of the connection members may be each constituted from an engaging ring. The engaging mechanisms may each have a structure including: a rotation arm configured to rotate about the center of rotation in a direction toward the buoyant body and in a direction away from the buoyant body; a first engaged portion provided at a side portion of the rotation arm on a side of the buoyant body, whereby the engaging ring is engaged with the first engaged portion; and a second engaged portion provided at a side portion of the rotation arm opposite to the side of the buoyant body and located at a position more outward than the first engaged portion as seen from the center of rotation, whereby the closed loop member is engaged with the second engaged portion. Then, the plurality of connection members are each sized to generate a force configured to rotate the rotation arm about the center of rotation in the direction away from the buoyant body when the engaging ring is engaged with the first engaged portion and the closed loop member is engaged with the second engaged portion. With this arrangement, when the engaging ring is engaged with the first engaged portion of each rotation arm, a force is applied from the engaging ring to the rotation arm in the direction away from the buoyant body, centering on the center of rotation. When the closed loop member is engaged with the second engaged portion of each rotation arm in this state, the closed loop member prevents rotation of the rotation arm in the direction away from the buoyant body, centering on the center of rotation. This preventive state continues as long as the closed loop member maintains the closed state. When the fusion cutting device operates to fusion cut the one or more portions to be fusion cut in the closed loop member and then the closed loop member comes into the open state, the closed loop member cannot exhibit the function of preventing rotation of each rotation arm. As a result, the tensile force applied to the connection members is released, and the buoyant body rises due to the buoyancy. Each rotation arm rotates in the direction away from the buoyant body, and then, the restraint of the buoyant body by the connection members is released. Accordingly, when this configuration is adopted, connection between the buoyant body and the weight may be facilitated, and the buoyant body may be readily released, using a simple structure.

Preferably, the engaging mechanisms share an axial member in the shape of a closed loop, disposed closer to the weight than the closed loop member and forming the center of rotation. In this case, the rotation arm has a through hole formed therein, whereby the axial member passes through the through hole. When the engaging mechanisms have such a structure, the rotation arms of the number corresponding to the number of the connection members may be readily provided. Further, positions of the rotation arms may be readily changed according to the positions of the connection members. Thus, an operation of assembling the connection structures is facilitated.

The one or more fusion cutting devices constituting the trigger mechanism may each include: a closed-loop-member enclosure configured to allow heat transfer to the one or more portions to be fusion cut in the closed loop member and slidably contain at least part of the closed loop member; an electric heater disposed outside the closed-loop-member enclosure and configured to heat the one or more portions to be fusion cut in the closed loop member through the closed-loop-member enclosure; a power source configured to supply electric current to the electric heater; and a power supply controller including a switch circuit configured to flow the electric current from the power source to the electric heater when the trigger mechanism comes into the operation state. Assume that such a fusion cutting device is used. In this fusion cutting device, the closed-loop-member enclosure contains the closed loop member so as to be slidable. Thus, when the buoyant body and the weight are fixed, adjustment of the length of the closed loop member and adjustment to prevent slackening of the closed loop member are possible. Further, by fusion cutting the one or more portions to be fusion cut in the closed loop member, the closed loop member that has been fusion cut smoothly comes out from the closed-loop-member enclosure. Thus, the closed loop member may be reliably brought into the open state. Further, as described above, the one or more fusion cutting devices may be provided in the present invention. Even when a plurality of these fusion cutting devices are provided, the closed loop member may be reliably brought to the open state.

DESCRIPTION OF EMBODIMENTS

Figure 1:
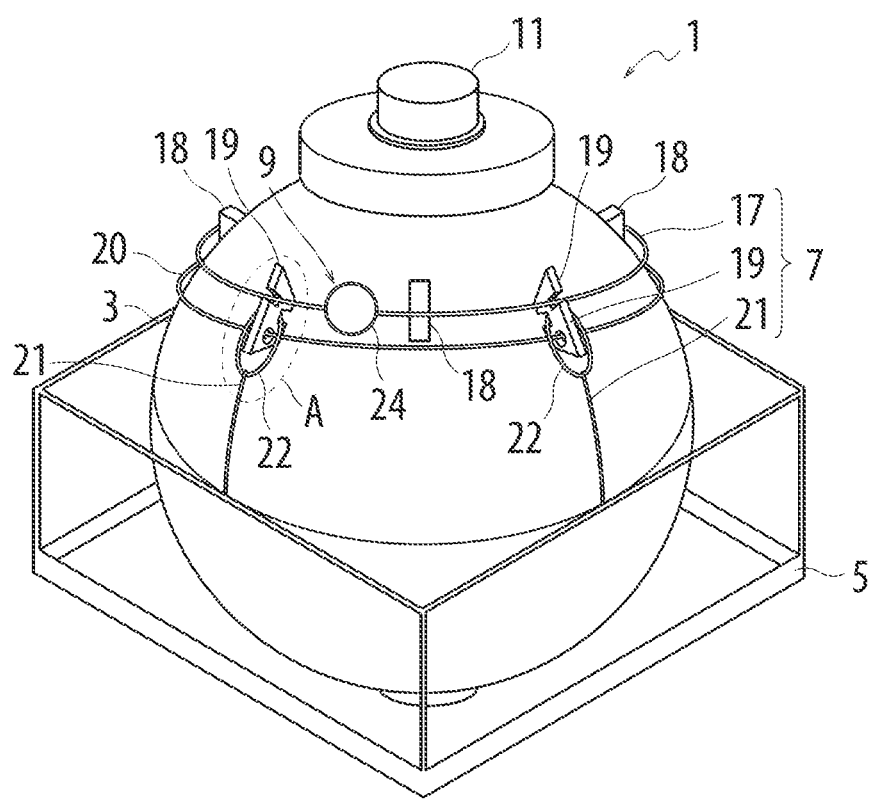
FIG. 1 is a diagram showing a whole observation device where a fixation releasing device of the present invention is mounted.
Figure 2:
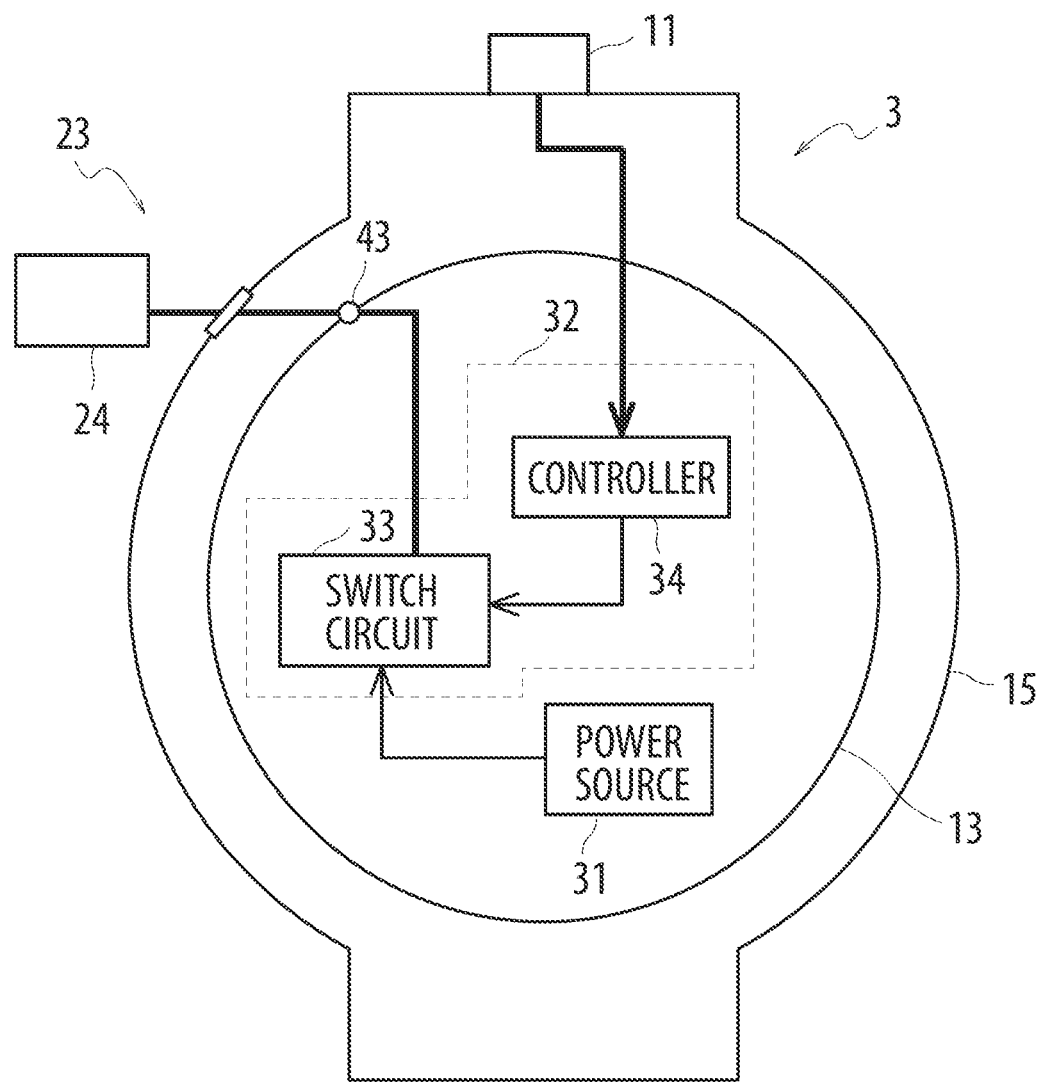
FIG. 2 is a block diagram in a first embodiment of the present invention showing an internal configuration of the observation device.
Figure 3:
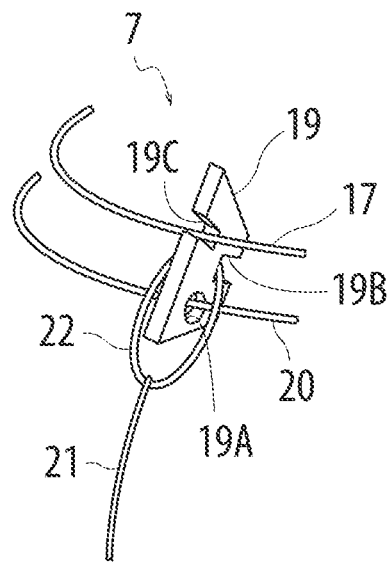
FIG. 3 is a schematic enlarged view showing enlargement of a region having a reference symbol A in FIG. 1.
Figure 4:
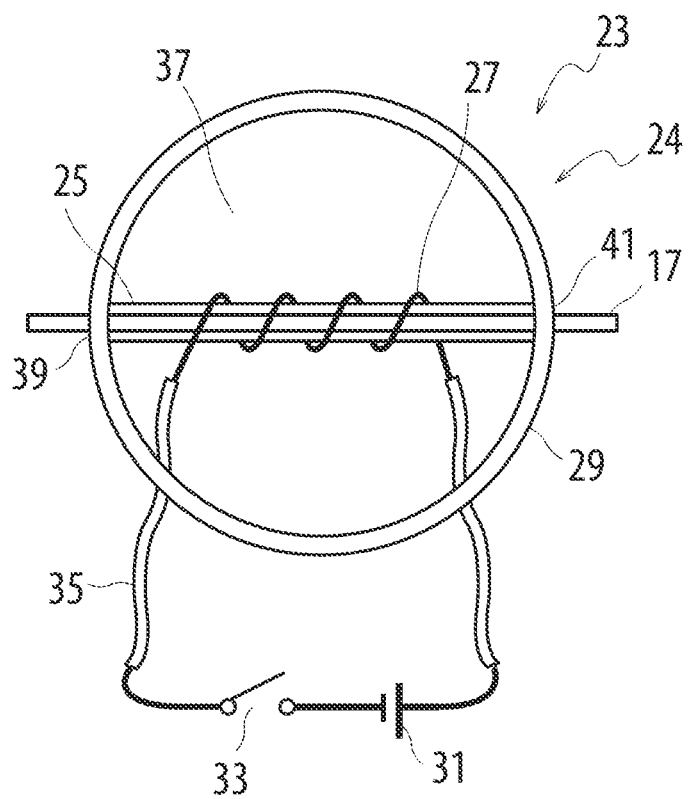
FIG. 4 is a diagram conceptually showing an example fusion cutting device included in the fixation releasing device of the present invention.
Figure 5:
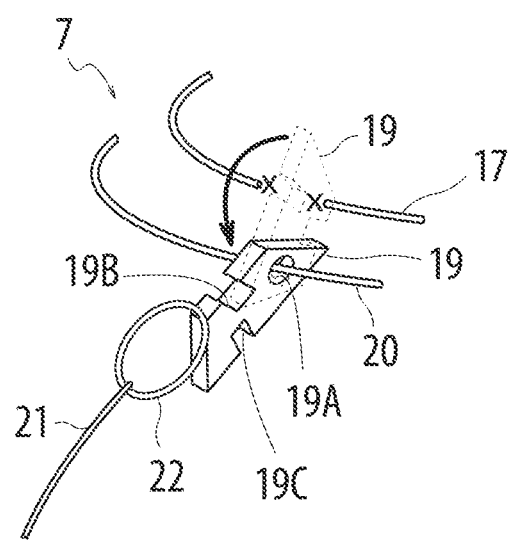
FIG. 5 is a diagram showing a state after a trigger mechanism of a connection device shown in FIG. 3 has been operated.
Figure 6:
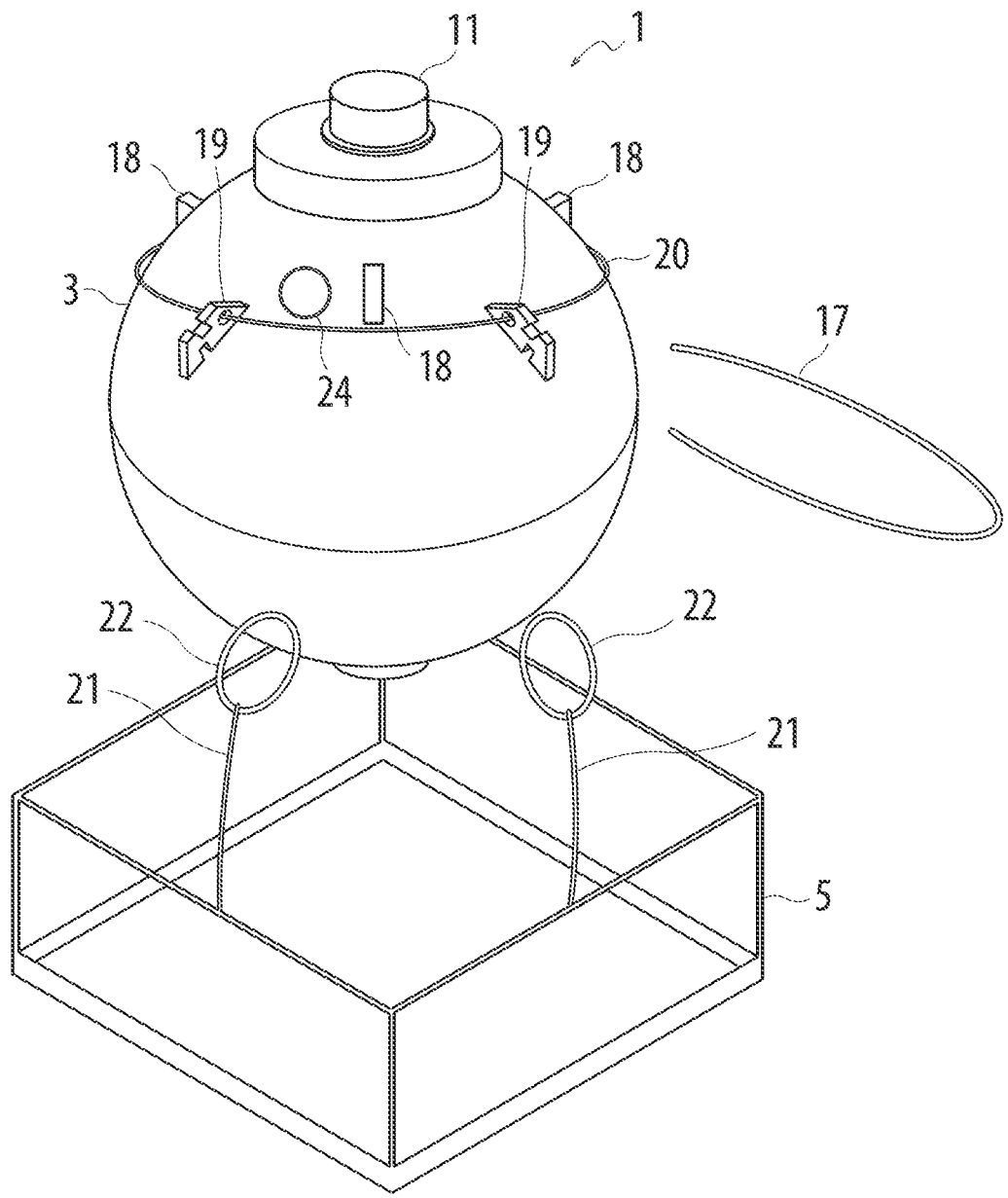
FIG. 6 is a diagram showing a state of the observation device after the trigger mechanism has been operated.

A fixation releasing device in embodiments of the present invention will be described below with reference to the drawings. FIG. 1 is a schematic diagram showing an example observation device where the fixation releasing device of the present invention is mounted. FIG. 2 is a block diagram in an embodiment showing an internal configuration of the observation device in FIG. 1. FIG. 3 is a schematic enlarged view showing enlargement of a region having a reference symbol A in FIG. 1. FIG. 4 is a diagram conceptually showing a fusion cutting device included in a trigger mechanism of the observation device in this embodiment. FIG. 5 is a diagram showing a state after the trigger mechanism of a connection device shown in FIG. 3 has been operated. FIG. 6 is a diagram showing a state of the observation device in this embodiment after the trigger mechanism has been operated.

<Observation Device>

An observation device 1 shown in FIG. 1 is an ocean bottom seismograph (OBS) installed on a sea floor or at the bottom of the ocean to carry out measurement. The observation device 1 includes an observation device body 3 (buoyant body) including therein a measuring device such as a seismograph and having buoyancy, an anchor 5 (weight) configured to sink the observation device body 3 onto the bottom of the ocean and moor the observation device body at the bottom of the ocean, a connection device 7 configured to connect the observation device body 3 and the anchor 5, a trigger mechanism 9, and a transducer 11 (receiving portion) for receiving a trigger signal for operating the trigger mechanism 9.

The observation device body 3 comprises a glass sphere 13 for withstanding a water pressure and protecting devices included in the glass sphere 13 from water immersion, and a hard hat 15 configured to protect the glass sphere 13, as shown in FIG. 2. In addition to the measuring device not shown, components for operating one or more fusion cutting devices 23 of the trigger mechanism 9 that will be described later are included inside the glass sphere 13. The observation device body 3 using the glass sphere 13 as a pressure resistant vessel is manufactured to be lighter than the weight of water corresponding to the drainage volume. Thus, the observation device body 3 has the buoyancy in the water. The anchor 5 is a heavy load formed of a metal or the like. Though not shown, a plurality of metal fittings for mounting connection members 21 that will be described later are fixed to the anchor 5.

<Connection Device>

FIG. 3 is a schematic enlarged view showing enlargement of the region having the reference symbol A in FIG. 1, and shows a portion of the connection device 7 connecting the observation device body 3 and the anchor 5. The observation device body 3 is, however, omitted.

The connection device 7 in this embodiment comprises a closed loop member 17, three rotation arms 19 (engaging mechanisms) mounted into an axial member 20 that is in the shape of a closed loop provided along an outer periphery of the hard hat 15, and three connection members 21 each constituted from a string-like member having stretchability or capable of being adjusted and fastened by appropriately setting the length thereof. Each connection member 21 has a structure in which an engaging ring 22 is provided at one end of the connection member 21 and the other end of the connection member 21 is fixed to a mounting metal fitting not shown and provided at the anchor 5. The three connection members 21 are disposed around the hard hat 15 at equal intervals. Referring to FIG. 1, two of the three connection members 21 are disposed to be seen, and the remaining one of the three connection members 21 is disposed at a position hidden by the observation device body 3.

The closed loop member 17 is engaged with a plurality of closed-loop-member mounting portions 18 in a stretched state such that the closed loop member 17 surrounds the plurality of closed-loop-member mounting portions 18 and sequentially connects the plurality of closed-loop-member mounting portions 18. The plurality of closed-loop-member mounting portions 18 are installed at intervals in a peripheral direction of the top portion of the observation device body 3. One fusion cutting device 23 that constitutes the trigger mechanism 9 and will be described later is mounted to the closed loop member 17. The closed loop member 17 in this embodiment is formed of a thermoplastic material such as nylon, and a portion of the closed loop member 17 that is provided with the fusion cutting device 23 constitutes a portion to be fusion cut.

A through hole 19A is formed in each of lower end regions of the three rotation arms 19. The through hole 19A is provided for passing the axial member 20 therethrough and for rotatably mounting the rotation arm 19 in a direction toward the observation device body 3 and in a direction away from the observation device body 3, using the axial member 20 as the center of rotation. Each rotation arm 19 is formed with a first engaged portion 19B and a second engaged portion 19C. The first engaged portion 19B is provided at a side portion of the rotation arm 19 on the side of the observation device body 3, whereby the engaging ring 22 is engaged with the first engaged portion 19B. The second engaged portion 19C is provided at a side portion of the rotation arm 19 opposite to the side of the observation device body 3 and located at a position more outward than the first engaged portion 19B as seen from the through hole 19A, whereby the closed loop member 17 is engaged with the second engaged portion 19C. The first engaged portion 19B and the second engaged portion 19C are each formed of a concave portion opening in a thickness direction of the rotation arm 19 and in a width direction of the rotation arm 19. The rotation arm 19 is mounted in a peripheral direction of the axial member such that the rotation arm 19 does not move. The rotation arm 19 is, however, mounted in a state having a slight allowance. The rotation arm 19 is thereby capable of being slightly moved in right and left directions.

Each rotation arm 19 is restrained not to rotate with respect to the axial member 20 and the connection member 21 is fixed by respectively fitting the engaging rings 22 of the three connection members 21 with the corresponding three rotation arms 19 to engage with the first engaged portions 19B, and engaging the closed loop member 17 with each of the second engaged portions 19C.

In this embodiment, a connection structure is formed of the rotation arms 19 and the axial member 20, and this connection structure and the closed loop member 17 constitute the connection device 7. The three rotation arms 19 and the three connection members 21 are used as an example in this embodiment to fix the observation device body 3 to the anchor 5. The numbers of the rotation arms 19 and the connection members 21 are, however, arbitrary if the observation device body 3 may be fixed to the anchor 5. The numbers of the rotation arms 19 and the connection members 21 may be changed according to the strength with which the observation device body 3 is fixed to the anchor 5 and the size of the observation device body 3. To take an example, five rotation arms 19 and five connection members 21 may be used. Further, a combination of the different numbers of the rotation arms 19 and the connection members 21 may be used as in a case where two connection members 21 are used for each of the three rotation arms 19 (namely, six connection members 21 in total are used).

<Trigger Mechanism>

The trigger mechanism 9 mainly comprises the one or more fusion cutting devices 23. When the trigger mechanism 9 operates, each fusion cutting device 23 fusion cuts the closed loop member 17, thereby releasing fixation of the rotation arm 19. Each fusion cutting device 23 has a configuration as conceptually shown in FIG. 4. FIG. 2 shows one fusion cutting device 23 is employed in one observation device 1 of this embodiment.

The fusion cutting device 23 includes a fusion cutting device body 24 comprising a closed-loop-member enclosure 25 in the shape of a tube configured to slidably pass the closed loop member 17 therethrough, an electric heater 27 wound outside the closed-loop-member enclosure 25 in the form of a coil, and a case 29 configured to contain these closed-loop-member enclosure 25 and electric heater 27, a power source 31 configured to supply electric current to the electric heater 27, and a switch circuit 33 configured to flow the electric current from the power source 31 to the electric heater 27, as shown in FIG. 4. The power source 31 is formed of a battery. The electric heater 27 and the power source 31 are electrically connected by a lead wire 35. Though a power supply controller is not illustrated in FIG. 4, the switch circuit 33 constitutes a portion of the power supply controller, as shown in FIG. 2.

The closed-loop-member enclosure 25 and the electric heater 27 are contained inside the case 29, in this embodiment. Silicone rubber 37 is filled inside the case 29, and the case 29 is processed such that a water pressure to be applied to the electric heater 27 is equal and the case 29 is a waterproof structure. The silicone rubber 37 in FIG. 4 is depicted to be transparent so as to show the internal structure of the case 29. The case 29 is provided with holes 39 and 41 located in opposite positions of the case 29. One end of the closed-loop-member enclosure 25 is aligned with the hole 39, and the other end of the closed-loop-member enclosure 25 is aligned with the hole 41, thereby forming within the case 29 a passage through which the closed loop member 17 passes. The power source 31 and the switch circuit 33 (of the power supply controller) are provided outside the case 29 and are included inside the glass sphere 13, as shown in FIG. 2, in this embodiment.

The closed-loop-member enclosure 25 is formed of a thermoplastic material, like the closed loop member 17. The closed-loop-member enclosure 25 is configured to be melted by heat generation by the electric heater 27. Assume that the closed-loop-member enclosure 25 is formed of the thermoplastic material such as polypropylene having a melting point equal to or less than the melting point of the thermoplastic material that forms the closed loop member 17. Then, when the electric heater 27 generates heat, the closed-loop-member enclosure 25 is first melt, and then, or simultaneously with the melting of the closed-loop-member enclosure 25, the closed loop member 17 is fusion cut.

The power source 31, and a power supply controller 32 formed of the switch circuit 33 and a controller 34 are contained inside the glass sphere 13. The power supply controller 32 is connected by the lead wire 35 to the fusion cutting device body 24 via an underwater connector 43 provided at the glass sphere 13, thereby forming the fusion cutting device 23.

The fusion cutting device 23 is structured as follows: when the transducer 11 receives a trigger signal, the switch circuit 33 turns on by the controller 34, and electric current flows from the power source 31 to the electric heater 27, thereby fusion cutting the closed-loop-member enclosure 25 and the closed loop member 17 that passes through the closed-loop-member enclosure within the fusion cutting device body 24 by heat generation by the electric heater 27.

<Fixation of Observation Device Body and Anchor>

The steps of fixing the observation device body 3 and the anchor 5 are described below.

(1) The observation device body 3 is disposed at a position to be fixed to the anchor 5 (refer to FIG. 1). The observation device body 3 is disposed within the frame of the anchor 5, in this embodiment.

(2) The closed loop member 17 in an open state before formation of a closed loop is disposed along the closed-loop-member mounting portions 18 installed outside the observation device body 3. Then, the closed loop member 17 is passed through the closed-loop-member enclosure 25 of the fusion cutting device body 24. End portions of the closed loop member 17 in the open state are then combined to form the closed loop. Since the closed loop member 17 is slidably contained in the closed-loop-member enclosure 25, adjustment of the length of the closed loop member 17 and adjustment that prevents slackening of the closed loop member 17 are possible.

(3) The engaging ring 22 of the connection member 21 is put around each rotation arm 19.

(4) Each rotation arm 19 is rotated such that the first engaged portion 19B is positioned on the side of the observation device body 3. Then, the rotation arm 19 is caused to come around under the closed loop member 17 using the allowance. The closed loop member 17 is then engaged with the second engaged portion 19C (as in the state shown in FIG. 3). In this state, the engaging ring 22 is engaged with the first engaged portion 19B, and a force is applied in the rotation direction of the rotation arm 19 due to a tensile force of the connection member 21. The rotation arm 19 is, however, restrained from rotating, by the closed loop member 17. This operation is similarly performed on all the rotation arms 19 and the connection members 21.

The observation device body 3 is fixed to the anchor 5 according to the above-mentioned procedure. In the case of the ocean bottom seismograph, the ocean bottom seismograph is transported to a measurement point by a ship after final preparations have been completed. Then, the ocean bottom seismograph is thrown into the ocean to be installed at the bottom of the ocean.

<Operation State of Trigger Mechanism>

When the observation device body 3 is recovered after completion of measurements or for maintenance of the measuring device, etc., the fusion cutting device 23 of the trigger mechanism 9 is operated according to the following procedure, thereby releasing the observation device body 3 from the anchor 5.

(1) A trigger signal is transmitted. The trigger signal is transmitted by a wireless transmitter from above the ocean or the ground, for example.

(2) When the transducer 11 receives the trigger signal, the controller 34 turns on the switch circuit 33.

(3) Direct electric current flows from the power source 31 to the electric heater 27, thereby fusion cutting the closed-loop-member enclosure 25 and the closed loop member 17 by heat that has been generated.

(4) By fusion cutting the closed loop member 17, restraint of each rotation arm 19 is released. The rotation arm 19 rotates in the direction away from the observation device body 3 due to the tensile force of the connection member 21. Then, by rotation of the rotation arm 19, the engaging ring 22 comes out of each rotation arm 19 (as shown in FIG. 5).

(5) The observation device body 3 is released from the anchor 5. Consequently, the observation device body 3 comes up toward the surface of the ocean (as shown in FIG. 6).

(6) Thereafter, the power supply controller returns the switch circuit 33 configured to flow the electric current from the power source 31 to the electric heater 27 to an off state, based on a physical change (e.g., change in a water pressure, an inclined angle, an acceleration, or an elapsed period of time) caused by the release of the observation device body 3 from the anchor 5 or completion of counting of the time limit of a timer.

The observation device body 3 may be recovered in a short period of time and with reliability by transmitting the trigger signal according to the above-mentioned procedure.

Figure 7:
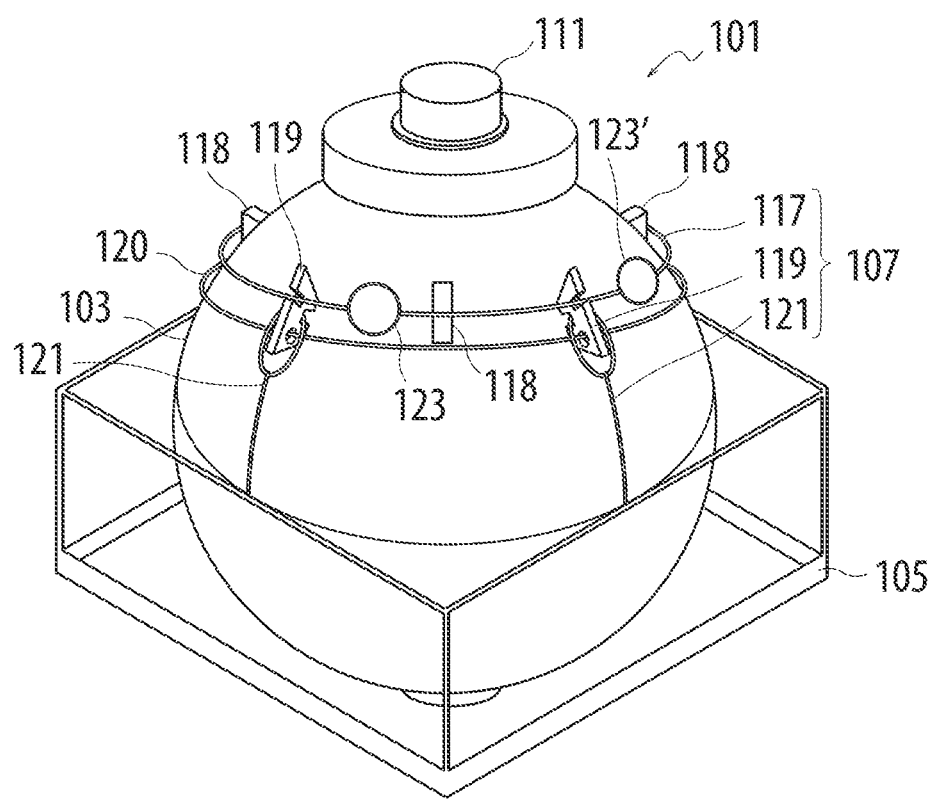
FIG. 7 is a diagram in a second embodiment of the present invention showing a whole observation device where fixation releasing devices of the present invention are mounted.

FIG. 7 shows an observation device according to a second embodiment of the present invention. Reference numerals obtained by adding 100 to the reference numerals of the parts in the embodiment shown in FIGS. 1 to 4 are allocated to counterparts that are the same as the parts in the embodiment shown in FIGS. 1 to 4. Description of the components that are the same as the components in the embodiment shown in FIGS. 1 to 4 will be thereby omitted. In the second embodiment, a trigger mechanism 109 provided at a closed loop member 117 includes two fusion cutting devices 123 and 123'. The fusion cutting device 123' shares a power source 133 and a power supply controller 132 of the fusion cutting device 123. Assume that two or more fusion cutting devices are provided in this manner. Then, even if the electric heater of one fusion cutting device 123 fails due to disconnection, for example, the closed loop member 117 may be fusion cut if another fusion cutting device 123' operates. An observation device body 103 may be recovered with reliability.

The fixation releasing device of the present invention may also be used at a location other than locations underwater and in the ocean. In the case of a radiosonde for meteorological investigation, for example, a weight installed on the ground and a balloon (buoyant body) may be connected by a connection device similar to the connection device in the first or second embodiment, and the balloon may be released to be flown by transmitting a trigger signal from a remote location.

INDUSTRIAL APPLICABILITY

As described above, in the fixation releasing device of the present invention, the buoyant body and the weight are connected by the connection device including the closed loop member. Then, by fusion cutting the closed loop member using the trigger mechanism, the buoyant body may be released. Accordingly, the buoyant body and the weight may be securely fixed, and the fixation state may be readily released, using a simple structure. Further, since the closed loop member is used, an installation space of other components may be secured at the top portion of the buoyant body.

DESCRIPTION OF REFERENCE SYMBOLS 1 observation device
3 observation device body
5 anchor
7 connection device
9 trigger mechanism
11 transducer
13 glass sphere
15 hard hat
17 closed loop member
18 closed-loop-member mounting portion
19 rotation arm
19A through hole
19B first engaged portion
19C second engaged portion
20 axial member in the shape of closed loop
21 connection member
22 engaging ring
23 fusion cutting device
24 fusion cutting device body
25 closed-loop-member enclosure
27 electric heater
29 case
31 power source
32 power supply controller
33 switch circuit
34 controller
35 lead wire
37 silicone rubber
39, 41 holes
43 underwater connector

The invention claimed is:

1. A fixation releasing device comprising a connection device configured to separatably connect a buoyant body and a weight disposed under the buoyant body, the connection device including a trigger mechanism configured to release connection between the buoyant body and the weight when the trigger mechanism comes into an operation state by a trigger signal, wherein:

the connection device includes:
a closed loop member including one or more portions to be fusion cut that are formed of a thermoplastic material; and
a connection structure disposed between the closed loop member and the weight, and configured to restrain the buoyant body when the closed loop member is in a closed state and to release restraint of the buoyant body when the closed loop member comes into an open state;
the trigger mechanism includes:
one or more fusion cutting devices configured to fusion cut the one or more portions to be fusion cut in the closed loop member, thereby bringing the closed loop member into the open state when the trigger mechanism comes into the operation state;
the closed loop member is disposed to surround a top portion of the buoyant body;
the connection structure includes:
a plurality of connection members disposed in a peripheral direction of the buoyant body at intervals, whereby one end of each connection member is fixed to the weight and the other end of each connection member includes an engaging portion; and
a plurality of engaging mechanisms configured to hold a plurality of the engaging portions of the plurality of connection members and the closed loop member in an engaged state using a tensile force to be applied to the plurality of connection members when the closed loop member is in the closed state and to release the engaged state between the plurality of the engaging portions of the plurality of connection members and the closed loop member using a force to be applied from the buoyant body to the plurality of connection members when the closed loop member comes into the open state;
the engaging portions are each constituted from an engaging ring;
the engaging mechanisms each have a structure including:
a rotation arm configured to rotate about the center of rotation in a direction toward the buoyant body and in a direction away from the buoyant body;
a first engaged portion provided at a side portion of the rotation arm on a side of the buoyant body, whereby the engaging ring is engaged with the first engaged portion; and
a second engaged portion provided at a side portion of the rotation arm opposite to the side of the buoyant body and located at a position more outward than the first engaged portion as seen from the center of rotation, whereby the closed loop member is engaged with the second engaged portion;
the plurality of connection members are each sized to generate a force configured to rotate the rotation arm about the center of rotation in the direction away from the buoyant body when the engaging ring is engaged with the first engaged portion and the closed loop member is engaged with the second engaged portion;
the engaging mechanisms share an axial member in a shape of closed loop, disposed closer to the weight than the closed loop member and forming the center of rotation; and
the rotation arm has a through hole formed therein, whereby the axial member passes through the through hole.

2. A fixation releasing device comprising: a connection device configured to separatably connect a buoyant body and a weight disposed under the buoyant body, the connection device including a trigger mechanism configured to release connection between the buoyant body and the weight when the trigger mechanism comes into an operation state by a trigger signal, wherein:
the connection device includes:
a closed loop member including one or more portions to be fusion cut that are formed of a thermoplastic material and; and
a connection structure disposed between the closed loop member and the weight, and configured to restrain the buoyant body when the closed loop member is in a closed state and to release restraint of the buoyant body when the closed loop member comes into an open state;
the trigger mechanism includes:
one or more fusion cutting devices configured to fusion cut the one or more portions to be fusion cut in the closed loop member, thereby bringing the closed loop member into the open state when the trigger mechanism comes into the operation state;
the closed loop member is disposed to surround a top portion of the buoyant body; and
the connection structure includes:
a plurality of connection members disposed in a peripheral direction of the buoyant body at intervals, whereby one end of each connection member is fixed to the weight and the other end of each connection member includes an engaging portion; and
a plurality of engaging mechanisms configured to hold a plurality of the engaging portions of the plurality of connection members and the closed loop member in a engaged state using a tensile force to be applied to the plurality of connection members when the closed loop member is in the closed state and to release the engaged state between the plurality of the engaging portions of the plurality of connection members and the closed loop member using a force to be applied from the buoyant body to the plurality of connection members when the closed loop member comes into the open state.

3. The fixation releasing device according to claim 2, wherein
the engaging portions are each constituted from an engaging ring;
the engaging mechanisms each have a structure including:
a rotation arm configured to rotate about the center of rotation in a direction toward the buoyant body and in a direction away from the buoyant body;
a first engaged portion provided at a side portion of the rotation arm on a side of the buoyant body, whereby the engaging ring is engaged with the first engaged portion; and
a second engaged portion provided at a side portion of the rotation arm opposite to the side of the buoyant body and located at a position more outward than the first engaged portion as seen from the center of rotation, whereby the closed loop member is engaged with the second engaged portion; and
the plurality of connection members are each sized to generate a force configured to rotate the rotation arm about the center of rotation in the direction away from the buoyant body when the engaging ring is engaged with the first engaged portion and the closed loop member is engaged with the second engaged portion.

4. The fixation releasing device according to claim 3, wherein the engaging mechanisms share an axial member in a shape of a closed loop, disposed closer to the weight than the closed loop member and forming the center of rotation; and the rotation arm has a through hole formed therein, whereby the axial member passes through the through hole.

5. A fixation releasing device comprising: a connection device configured to separatably connect a buoyant body and a weight disposed under the buoyant body, the connection device including a trigger mechanism configured to release connection between the buoyant body and the weight when the trigger mechanism comes into an operation state by a trigger signal, wherein:

the connection device includes:

a closed loop member including one or more portions to be fusion cut that are formed of a thermoplastic material and; and a connection structure disposed between the closed loop member and the weight, and configured to restrain the buoyant body when the closed loop member is in a closed state and to release restraint of the buoyant body when the closed loop member comes into an open state;

the trigger mechanism includes:

one or more fusion cutting devices configured to fusion cut the one or more portions to be fusion cut in the closed loop member, thereby bringing the closed loop member into the open state when the trigger mechanism comes into the operation state; and, the one or more fusion cutting devices each include:

a closed-loop-member enclosure configured to allow heat transfer to the one or more portions to be fusion cut in the closed loop member and slidably contain at least part of the closed loop member;

an electric heater disposed outside the closed-loop-member enclosure and configured to heat the one or more portions to be fusion cut in the closed loop member through the closed-loop-member enclosure;

a power source configured to supply electric current to the electric heater; and a power supply controller including a switch circuit configured to flow the electric current from the power source to the electric heater when the trigger mechanism comes into the operation state.

6. An observation device including the fixation releasing device according to claim 1 and configured to be installed on a water bottom.

7. An ocean bottom seismograph including the fixation releasing device according to claim 1 and configured to be installed on a sea floor.

8. An observation device including the fixation releasing device according to claim 2 and configured to be installed on a water bottom.

9. An observation device including the fixation releasing device according to claim 3 and configured to be installed on a water bottom.

10. An observation device including the fixation releasing device according to claim 4 and configured to be installed on a water bottom.

11. An observation device including the fixation releasing device according to claim 5 and configured to be installed on a water bottom.

12. An ocean bottom seismograph including the fixation releasing device according to claim 2 and configured to be installed on a sea floor.

13. An ocean bottom seismograph including the fixation releasing device according to claim 3 and configured to be installed on a sea floor.

14. An ocean bottom seismograph including the fixation releasing device according to claim 4 and configured to be installed on a sea floor.

15. An ocean bottom seismograph including the fixation releasing device according to claim 5 and configured to be installed on a sea floor.

* * * * *